United States Patent
Jang

(10) Patent No.: US 8,743,112 B2
(45) Date of Patent: Jun. 3, 2014

(54) IMAGE DISPLAY DEVICE AND DRIVING METHOD FOR THEREOF

(75) Inventor: Jun Woo Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 195 days.

(21) Appl. No.: 13/289,758

(22) Filed: Nov. 4, 2011

(65) Prior Publication Data

US 2012/0113107 A1    May 10, 2012

(30) Foreign Application Priority Data

Nov. 5, 2010   (KR) .................. 10-2010-0109751

(51) Int. Cl.
   *G06T 15/00*    (2011.01)
(52) U.S. Cl.
   USPC .......................................... 345/419
(58) Field of Classification Search
   CPC .............. H04N 13/0468; H04N 13/0472
   USPC ........................................... 345/419
   See application file for complete search history.

(56) References Cited

U.S. PATENT DOCUMENTS

| 4,647,965 A * | 3/1987 | Imsand ........................... 348/47 |
| 8,094,927 B2 * | 1/2012 | Jin et al. ........................ 382/154 |
| 2008/0192112 A1 * | 8/2008 | Hiramatsu et al. .............. 348/51 |

FOREIGN PATENT DOCUMENTS

EP    0279092 A1    8/1988

OTHER PUBLICATIONS

Office Action issued in corresponding Chinese Patent Application No. 201110351251.0, mailed Dec. 4, 2013, 18 pages.

* cited by examiner

Primary Examiner — Sath V Perungavoor
Assistant Examiner — Jeffery Williams
(74) Attorney, Agent, or Firm — Brinks Gilson & Lione

(57) ABSTRACT

Disclosed are an image display device and a driving method thereof. The image display device separates left-eye image data and right-eye image data from an input image signal, analyzes the left-eye image data and right-eye image data to acquire brightness of a left-eye image and brightness of a right-eye image, acquires a viewing distance between a viewer and a screen which displays the left-eye image and right-eye image, adjusts a moved distance of a pixel in the left-eye image and right-eye image on the basis of at least one of the brightness of the left-eye image and right-eye image and the viewing distance, and divides and displays a left-eye image and right-eye image with respective adjusted depths thereof, in time or space.

9 Claims, 4 Drawing Sheets

Left image    Right image    3D image

IMAGE DISPLAY DEVICE AND DRIVING METHOD FOR THEREOF

CROSS REFERENCE TO RELATED APPLICATIONS

This application claims the benefit of the Korean Patent Application No. 10-2010-0109751, filed on Nov. 5, 2010, which is hereby incorporated by reference as if fully set forth herein.

BACKGROUND

1. Field of the Disclosure

The present disclosure relates to an image display device, and more particularly, to an image display device and a driving method thereof, which lead to the enhancement of display quality by adjusting the depth of a Three-Dimensional (3D) image, and can reduce fatigability due to viewing of the 3D image.

2. Discussion of the Related Art

As enlarging and thinning of display devices are required by consumers in the market, technology for enlarging and thinning the display devices is being developed. The demands of Flat Panel Display (FPD) devices, which are thin and light and consume a low power, are increasing.

As FPD devices, Liquid Crystal Display (LCD) devices, Plasma Display Panels (PDPs), Field Emission Display (FED) devices and Light Emitting Diode (LED) display devices are being researched.

In such FPD devices, the application fields of LCD devices are being expanded because the LCD devices are easily manufactured and have drivability of drivers, low power consumption, thin thickness, high image quality and a large screen.

LCD devices include a liquid crystal panel having a plurality of pixels that are arranged in a matrix type, a backlight unit that supplies light to the liquid crystal panel, and a driving circuit that drives the liquid crystal panel.

In each pixel, the alignment of liquid crystal is changed by an electric field that is generated by a potential difference between a pixel electrode and a common electrode, and an image is displayed by aligning the liquid crystal and controlling the transmittance of light that is supplied from the backlight unit.

Recently, as a vivid image is increasingly required by users, LCD devices for displaying a Two-Dimensional (2D) image and 3D image are being developed.

LCD devices (hereinafter referred to as 3D LCD devices) for displaying a 3D image generally realize the 3D image with binocular parallax of a viewer, and are largely categorized into LCD devices with 3D special glasses and LCD devices with no 3D special glasses.

As a type using 3D special glasses, a Shutter Glass (SG) type and a patterned retarder type have been developed.

Referring to FIG. 1, the shutter glass type of LCD device sequentially displays a left-eye image and a right-eye image with time, and selectively transmits the sequentially displayed left-eye image and right-eye image through 3D special glasses, thereby realizing a 3D image.

Referring to FIG. 2, the patterned retarder type of LCD device spatially divides a display area of a liquid crystal panel to display a left-eye image and a right-eye image, and selectively transmits the left-eye image and right-eye image through linear polarization film glasses or circular polarization film glasses, thereby realizing a 3D image.

A related art 3D LCD device has a limitation in that fatigability is caused by viewing of a 3D image, and thus, research for solving the limitation is being conducted. There are various causes that affect fatigability due to viewing of the 3D image. Among the causes, a main cause is mismatch between the accommodation and convergence of eyes.

In the related art 3D LCD device, binocular accommodation and convergence are mismatched when a Depth Of Field (DOF) value ($\Delta D$) is greater than 0.2D (i.e., $\Delta D > 0.2D$), causing fatigability in viewing a 3D image.

When binocular accommodation and convergence are mismatched, the related art 3D LCD device cannot compensate for the mismatch because the 3D image viewing environments of viewers are not considered. Particularly, in the related art 3D LCD device, it is impossible to adjust the depth of the 3D image, and thus, the display quality of the 3D image is degraded, causing fatigability in viewing the 3D image.

SUMMARY

A driving method of an image display device which includes: separating left-eye image data and right-eye image data from an input image signal; analyzing the left-eye image data and right-eye image data to acquire brightness of a left-eye image and brightness of a right-eye image; acquiring, by a distance measurement sensor, a viewing distance between a viewer and a screen which displays the left-eye image and right-eye image; adjusting a moved distance of a pixel in the left-eye image and right-eye image, on the basis of at least one of the brightness of the left-eye image, the brightness of the right-eye image, and the viewing distance; and dividing and displaying a left-eye image and right-eye image with respective adjusted depths thereof, in time or space.

In another aspect, an image display device includes: an image separation unit separating left-eye image data and right-eye image data from an input image signal; a brightness analysis unit analyzing the left-eye image data and right-eye image data to calculate brightness of a left-eye image and brightness of a right-eye image; a distance measurement unit acquiring a viewing distance between a viewer and a screen which displays the image; an image depth adjustment unit adjusting a moved distance of a pixel in the left-eye image and right-eye image on the basis of at least one of the brightness of the left-eye image, the brightness of the right-eye image, and the viewing distance, and adjusting depths of the left-eye image and right-eye image according to the moved distance of the pixel; a liquid crystal panel dividing and displaying the left-eye image and right-eye image with respective adjusted depths thereof, in time or space; and a 3D special glasses selectively transmitting the left-eye image and right-eye image with respective adjusted depths thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an image display device and a driving method thereof, according to embodiments of the present invention, will be described with reference to the accompanying drawings.

Figure 1:
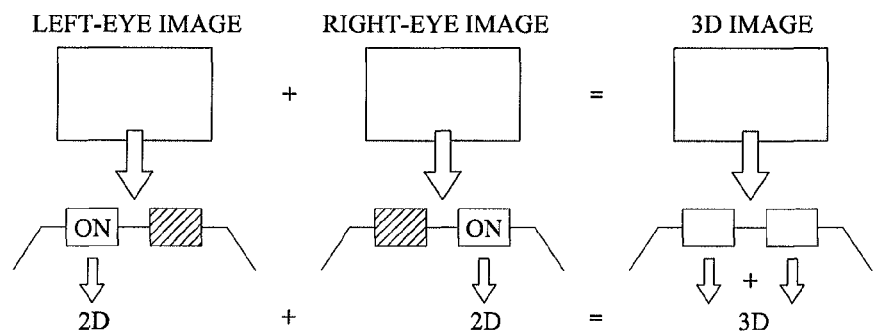
FIG. 1 is a diagram illustrating a shutter glass type of 3D image display device and a driving method thereof.
Figure 2:
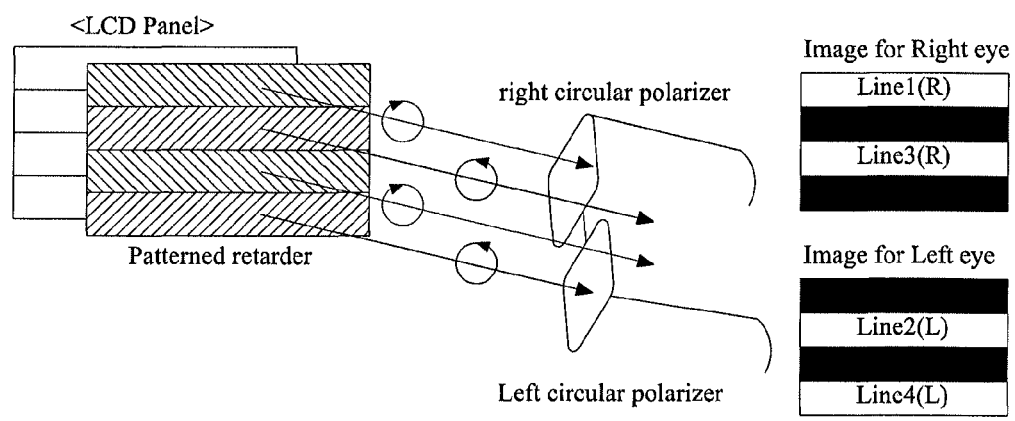
FIG. 2 is a diagram illustrating a patterned retarder type of 3D image display device and a driving method thereof.
Figure 3:
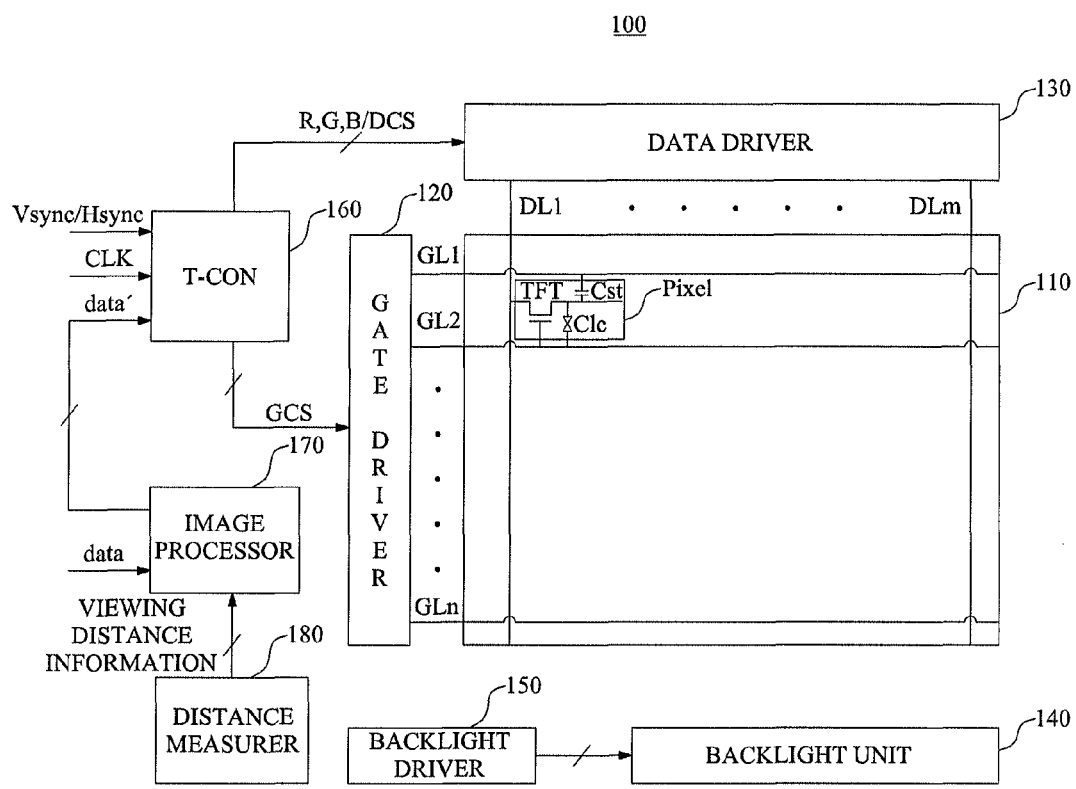
FIG. 3 is a block diagram illustrating an image display device according to an embodiment of the present invention.
Figure 4:
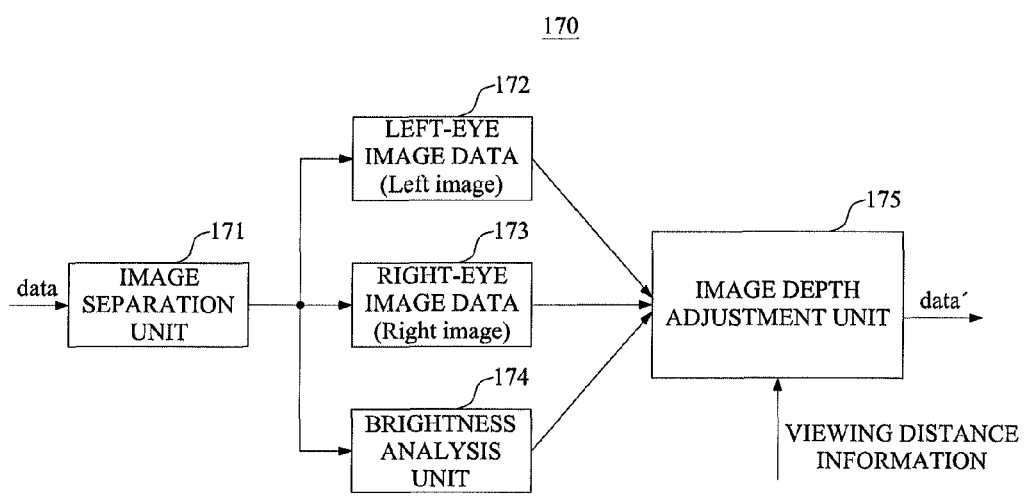
FIG. 4 is a block diagram illustrating an image processor of FIG. 3.

FIG. 3 is a block diagram illustrating an image display device according to an embodiment of the present invention. FIG. 4 is a block diagram illustrating an image processor of FIG. 3.

Referring to FIG. 3, an image display device according to an embodiment of the present invention includes a liquid crystal panel 110, a gate driver 120, a data driver 130, a backlight unit 140, a backlight driver 150, a timing controller 160, an image processor 170, and a distance measurer 180.

The liquid crystal panel 110 controls the transmittance of light, supplied from the backlight unit 140, to display an image according to an input image signal. The liquid crystal panel 110 includes a plurality of gate lines G1 to Gn and data lines D1 to Dm.

Moreover, the liquid crystal panel 110 includes a plurality of pixels that are respectively formed in a plurality of areas defined by the perpendicular intersection of the gate lines G1 to Gn and data lines D1 to Dm.

Each of the pixels includes a thin film transistor TFT and a storage capacitor Cst that are formed in an intersected portion of a corresponding data line and gate line.

Herein, the liquid crystal panel 110 divides and displays a left-eye image and a right-eye image in time or space, according to input image data.

Specifically, when a 3D image is realized in a shutter glass type, the liquid crystal panel 110 sequentially divides and displays the left-eye image and right-eye image with time.

When a 3D image is realized in a patterned retarder type, the liquid crystal panel 110 spatially divides and displays a left-eye image and a right-eye image. In this case, the spatial division of the left-eye image and right-eye image may be performed with respect to a horizontal line or vertical line of the liquid crystal panel 110.

The timing controller 160 converts image data (data'), of which depth has been adjusted by the below-described image processor 170, into digital image data RGB of a frame unit, and supplies digital image data, aligned by frame unit, to the data driver 130. Herein, the image data RGB are configured with left-eye data and right-eye data.

Moreover, the timing controller 160 generates a gate control signal GCS for controlling the gate driver 120 and a data control signal DCS for controlling the data driver 130 by using a vertical sync signal Vsync, horizontal sync signal Hsync, and clock signal CLK.

The timing controller 160 supplies the gate control signal GCS to the gate driver 120, and supplies the data control signal DCS to the data driver 130.

Herein, the data control signal DCS may include a source start pulse SSP, a source sampling clock SSC, a source output enable signal SOE, and a polarity control signal POL.

The gate control signal GCS may include a gate start pulse GSP, a gate shift clock GSC, and a gate output enable signal GOE.

Although not shown, the image display device 100 may realize a 3D image with a shutter glass or polarized glasses.

Herein, when the 3D image is realized with the shutter glass, the timing controller 160 generates a shutter glass control signal for controlling the shutter glass in order for a viewer to recognize an image displayed on the liquid crystal panel 110 as a 3D image, and supplies the shutter glass control signal to the shutter glass (not shown).

For this end, the timing controller 160 may include a means (module) for generating and transferring the shutter glass control signal, which may be supplied to the shutter glass by wired or wireless medium. Herein, the shutter glass control signal may be generated and transferred with the vertical/horizontal sync signal (Vsync/Hsync).

The gate driver 120 generates a scan signal (gate driving signal) for driving a thin film transistor TFT that is formed in each pixel, according to the gate control signal GCS from the timing controller 160.

The scan signal generated by the gate driver 120 is sequentially supplied to the gate lines G1 to Gn of the liquid crystal panel 110, and the thin film transistor TFT of each pixel is driven by the scan signal.

The data driver 130 respectively converts digital image data RGB, of which respective depths have been adjusted by the image processor 170 and which are supplied from the timing controller 160, into analog data signals (data voltages).

The data driver 130 supplies the analog data signals (data voltages) to the data lines D1 to Dm of the liquid crystal panel 110 according to the data control signal DCS, respectively.

Since the liquid crystal panel 110 cannot self emit light, the liquid crystal panel 110 displays an image with light supplied from the backlight unit 140.

The backlight unit 140 is for irradiating light on the liquid crystal panel 110, and includes a plurality of backlights (for example, Cold Cathode Fluorescent Lamps (CCFLs), External Electrode Fluorescent Lamps (EEFLs), and/or Light Emitting Diodes (LEDs)) that emit the light.

Moreover, the backlight unit 140 may include an optical member (for example, a light guide plate, a diffusive plate, a diffusive sheet, a prism sheet, and a Dual Brightness Enhancement Film (DBEF)) that guides the light, emitted by the backlights, toward the liquid crystal panel 110 and enhances light efficiency.

The backlight driver 150 drives the backlights at a predetermined driving frequency (for example, 60 Hz, 100 Hz, 120 Hz, 200 Hz, or 240 Hz), and controls the turn-on/off timing, duty ratio, and brightness of each backlight.

The distance measurer 180 measures a distance between a viewer and the screen of the image display device 100, namely, an image displayed on the liquid crystal panel 110. The distance measurer 180 is configured with a distance measurement sensor (for example, an infrared sensor).

As an example, in the distance measurer 180, the distance measurement sensor measures a viewing distance between the viewer and the liquid crystal panel 110, namely, a viewing distance between the liquid crystal panel 110 and the 3D special glasses (for example, the shutter glass or polarized glasses). The distance measurer 180 provides information of the measured viewing distance to the image processor 170.

Herein, the distance measurer 180 may be implemented by disposing the distance measurement sensor at an external case of the image display device 100, or implemented by disposing the distance measurement sensor at the 3D special glasses.

The image processor 170 adjusts the depth of a 3D image (i.e., a left-eye image and right-eye image) on the basis of the viewing distance information and the brightness and/or viewing distance of an image (for example, a left-eye image or right-eye image) displayed on the liquid crystal panel 110. Therefore, the display quality of the 3D image can be enhanced, and fatigability due to viewing of the 3D image can be reduced.

For this end, as illustrated in FIG. 4, the image processor 170 includes an image separation unit 171, a brightness analysis unit 174, and an image depth adjustment unit 175. Hereinafter, the image processor 170 and a driving method of the image display device 100, according to an embodiment of the present invention, will be described in detail with reference to FIGS. 5 to 8.

As described above, fatigability due to viewing of the 3D image arises generally when binocular accommodation and convergence are mismatched. Such a case may be defined on the basis of the DOF value ($\Delta D$).

Figure 5:
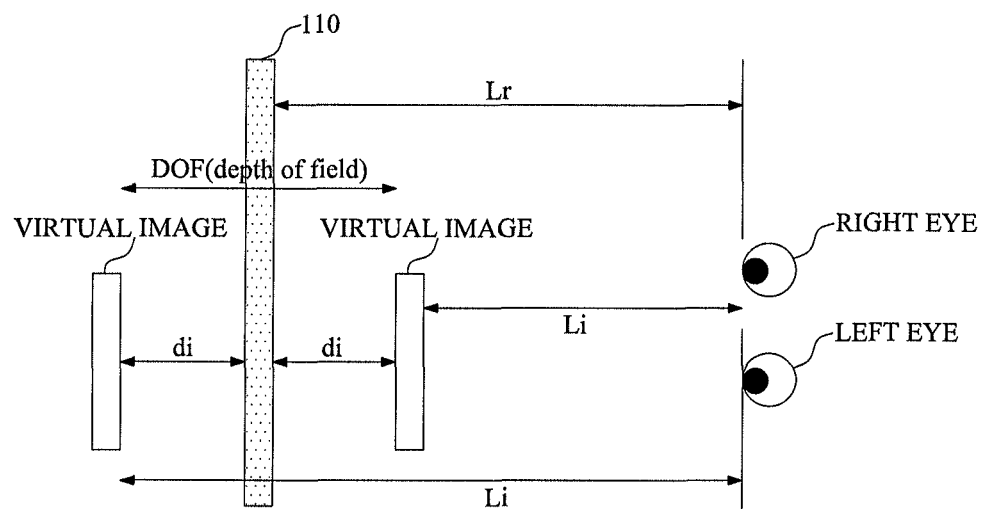
FIGS. 5 to 8 are diagrams illustrating a driving method of an image display device, according to an embodiment of the present invention.

The DOF value, as illustrated in FIG. 5, is determined according to a distance between the liquid crystal panel 110 and a virtual image of an image (which is generated on the liquid crystal panel 110), a distance between the virtual image and a viewer's eyes, and the brightness of the image displayed on the liquid crystal panel 110.

The DOF value ($\Delta D$) may be calculated with Equation (1) below.

$$\Delta D = \frac{1}{Li} - \frac{1}{Lr} = \frac{1}{Lr - di} - \frac{1}{Lr} \quad (1)$$

where Lr denotes a distance between the liquid crystal panel 110 and a viewer's eyes, Li denotes a distance between the viewer's eyes and a virtual image of an image displayed on the liquid crystal panel 110, and di denotes a distance between the liquid crystal panel 110 and the virtual image.

Light emitted from one point passes through an optical system such as a lens and is again concentrated on another point, in which case a distance to the other point (which is a position with the virtual image generated thereat), on which the light is again concentrated, is determined according to a distance between a light source emitting the light and the lens through which the light passes. That is, only one position, where light emitted from one point disposed on a light axis is again and accurately concentrated on another point, exists on the light axis.

If an image plane of an image side moves in spite of a predetermined distance, light that passes through a lens and is irradiated on the image plane has a discus shape instead of a dot shape.

Due to this reason, a phase generated on an image plane is not clear or shown blurredly. That is, since a phase is blurredly generated in realizing a 3D image, the display quality of the 3D image is degraded, and fatigability due to viewing of the 3D image arises.

The DOF denotes a range where a blurry phase of an image plane is not generated, and thus, the accommodation reactions of eyes are changed according to a distance between a left-eye image and a right-eye image that are displayed on a 3D image display device, and the diameters of the respective pupils of the eyes are changed in size according to the change in the brightness of an image.

In the embodiment, the accommodation and convergence of eyes are matched by adjusting the depth of an image on the basis of at least one of image brightness and a viewing distance according to the DOF.

Figure 6:
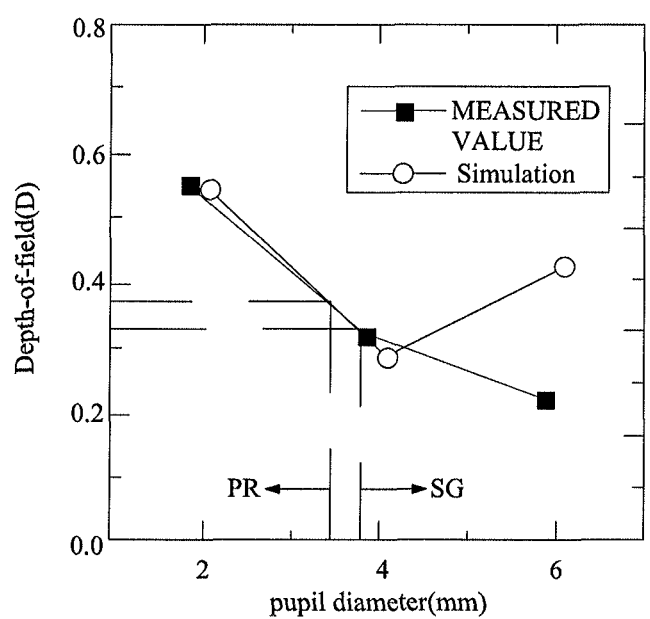

As illustrated in FIG. 6, the DOF is changed according to the change of brightness. In FIG. 6, SG indicates that the DOF is changed according to the change of brightness in realizing a 3D image based on the shutter glass type, and PR indicates that the DOF is changed according to the change of brightness in realizing a 3D image based on a polarized glasses type.

Specifically, when the brightness of an image displayed on the liquid crystal panel 110 becomes higher, a pupil is reduced, thereby increasing a duration for which the accommodation and convergence of eyes are matched. In the embodiment, by analyzing input left-eye image data and right-eye image data, the depths of a high-brightness image and low-brightness image are adjusted differently.

Moreover, the depth of an image is differently adjusted according to a measured viewing distance. In this case, the depth of the image is adjusted on the basis of the maximum depth where the accommodation and convergence of eyes are matched.

For this end, the image separation unit 171 separates left-eye image data 172 and right-eye image data 173 from an image signal inputted from the outside.

Herein, the image separation unit 171 includes a memory that stores the left-eye image data 172 and right-eye image data 173 separated from the image signal.

When the format of image data is "side by side", a line memory may be used. When the format of image data is "top down", a frame memory may be used.

The brightness analysis unit 174 analyzes the left-eye image data 172 and right-eye image data 173 to acquire brightness information of the left-eye image data 172 and right-eye image data 173. Furthermore, the brightness analysis unit 174 supplies the acquired brightness information of the left-eye image data 172 and right-eye image data 173 to the image depth adjustment unit 175.

Figure 7:
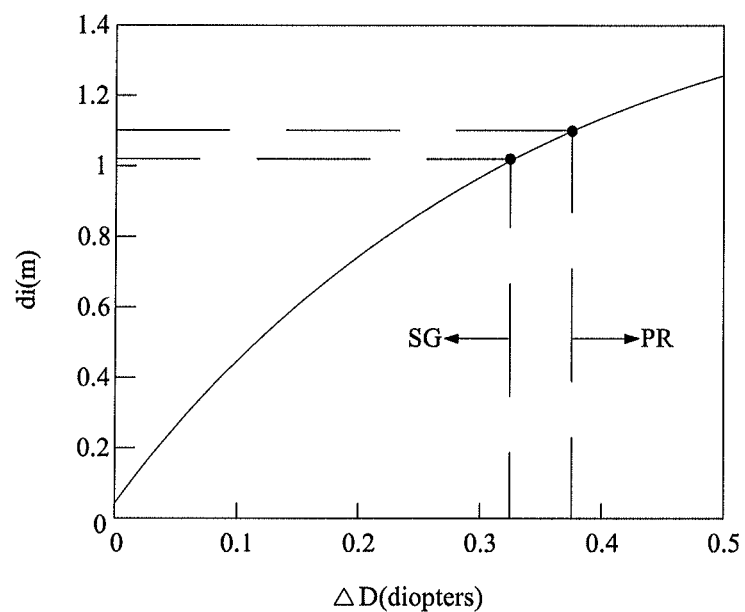

The image depth adjustment unit 175 adjusts the depths of the left-eye image data 172 and right-eye image data 173 on the basis of the viewing distance information supplied from the distance measurement unit 180 and the brightness information of the left-eye image data 172 and right-eye image data 173 supplied from the brightness analysis unit 174. In this case, as illustrated in FIG. 7, the image depth adjustment unit 175 adjusts the depth of an image on the basis of the maximum depth where the accommodation and convergence of eyes are matched.

Figure 8:
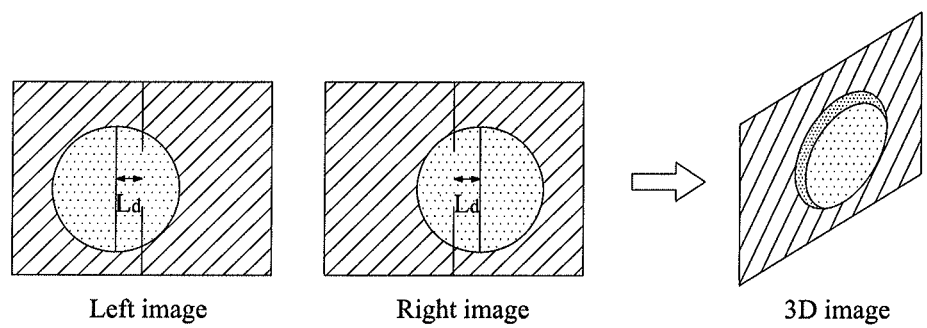

Referring to FIG. 8, the depth of an image is determined as the size of Ld that is the moved distance of an image pixel, which may be calculated with Equation (2) below.

$$Ld = \alpha^* \times Lv \quad (2)$$

where Lv denotes brightness of a left-eye image and right-eye image analyzed by the brightness analysis unit 174, and $\alpha^*$ is a constant that defines a relationship between the brightness (Lv) of an image and the moved distance (Ld) of a pixel based on a viewing distance. Herein, the constant may increase/decrease in proportion to the viewing distance and brightness.

When a displayed image has the same brightness, as a viewing distance increases, $\alpha^*$ increases, and thus, a moved distance of a pixel in an image increases. Also, when a viewing distance is the same, as the brightness of an image increases, α* increases, and thus, a moved distance of a pixel in an image increases.

The constant (α*), which defines a relationship between the brightness (Lv) of an image and the moved distance (Ld) of a pixel based on a viewing distance, may be calculated with the maximum depth (based on the brightness of the image and the viewing distance) where the accommodation and convergence of eyes are matched, and stored in a lookup table type.

In a first embodiment of the present invention, the depth of an image that is displayed at different brightness within the same distance may be adjusted as follows.

As an example, when the brightness of a displayed image is 24 nit and the maximum depth where the accommodation and convergence of eyes are matched is 1.0 m, by decreasing the moved distance (Ld) of a pixel in an image, the depth of the image is adjusted to less than 1.0 m being the maximum depth.

As another example, when the brightness of a displayed image is 60 nit and the maximum depth where the accommodation and convergence of eyes are matched is 1.1 m, by increasing the moved distance (Ld) of a pixel in an image, the depth of the image is adjusted to less than 1.1 m being the maximum depth.

The image depth adjustment unit 175, as described above, adjusts the moved distance of a pixel in a left-eye image and right-eye image to adjust the depth of an image according to the brightness of the image, within the maximum depth where the accommodation and convergence of eyes are matched.

In a second embodiment of the present invention, the depth of an image displayed at the same brightness may be adjusted according to a viewing distance as follows.

As an example, when a viewing distance is 1.0 m and the maximum depth where the accommodation and convergence of eyes are matched is 1.0 m, by decreasing the moved distance (Ld) of a pixel in an image, the depth of the image is adjusted to less than 1.0 m being the maximum depth.

As another example, when a viewing distance is 2.0 m and the maximum depth where the accommodation and convergence of eyes are matched is 1.1 m, by increasing the moved distance (Ld) of a pixel in an image, the depth of the image is adjusted to less than 1.1 m being the maximum depth.

The image depth adjustment unit 175, as described above, adjusts the moved distance of a pixel in a left-eye image and right-eye image to adjust the depth of an image according to the brightness of the image, within the maximum depth where the accommodation and convergence of eyes are matched.

As described above, the depth-adjusted image data (data') are supplied to the timing controller 160. The timing controller 160 aligns the depth-adjusted image data (data') by frame unit and supplies a left-eye image and right-eye image with respective adjusted depths thereof to the data driver 130, thereby displaying the left-eye image and right-eye image on the liquid crystal panel 110.

Accordingly, the present invention can enhance the display quality of a 3D image, and thus reduce fatigability due to viewing of the 3D image.

In the above description, the driving method of the image display device, according to embodiments of the present invention, has been applied to the LCD device, but the present invention is not limited thereto. The method of adjusting the depth of a 3D image, according to embodiments of the present invention, may also be applied to FPD devices other than the LCD devices.

In the embodiments of the present invention, moreover, the LCD device has been described above as being applied as an example of the image display device, but the present invention is not limited thereto. That is, the spirit and scope of the present invention may be identically applied to FPD devices other than the LCD device.

The image display device and driving method thereof, according to embodiments of the present invention, adjust the depth of the 3D image, leading to the enhancement of display quality of the 3D image.

The image display device and driving method thereof, according to embodiments of the present invention, adjust the depth of a 3D image and thus can reduce fatigability due to viewing of the 3D image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A driving method of an image display device, the comprising:
    separating left-eye image data and right-eye image data from an input image signal;
    analyzing the left-eye image data and right-eye image data to acquire brightness of a left-eye image and brightness of a right-eye image;
    acquiring, by a distance measurement sensor, a viewing distance between a viewer and a screen which displays the left-eye image and right-eye image;
    adjusting a moved distance of a pixel in the left-eye image and right-eye image, on the basis of at least one of the brightness of the left-eye image, and the brightness of the right-eye image, and the viewing distance; and
    dividing and displaying a left-eye image and right-eye image with respective adjusted depths thereof, in one of time or space,
    wherein when a brightness of a displayed image is constant, a pixel movement distance of the image according to the viewing distance increases is increased, or when the viewing distance is constant, the pixel movement distance of the image as the brightness of the image increases is increased.

2. The driving method according to claim 1, wherein the adjusting of a moved distance comprises adjusting the moved distance of the pixel in the left-eye image and right-eye image to adjust a depth of an image according to brightness of the image, within a maximum depth where accommodation and convergence of the viewer's eyes are matched.

3. The driving method according to claim 1, wherein the adjusting of a moved distance comprises adjusting the moved distance of the pixel in the left-eye image and right-eye image to adjust a depth of an image according to the viewing distance, within a maximum depth where accommodation and convergence of the viewer's eyes are matched.

4. The driving method according to claim 1, wherein the moved distance of the pixel is adjusted in proportion to the viewing distance and the brightness of the left-eye image and right-eye image.

5. An image display device comprising:
    an image separation unit separating left-eye image data and right-eye image data from an input image signal;
    a brightness analysis unit analyzing the left-eye image data and right-eye image data to calculate brightness of a left-eye image and brightness of a right-eye image;
    a distance measurement unit acquiring a viewing distance between a viewer and a screen which displays the image;

an image depth adjustment unit adjusting a moved distance of a pixel in the left-eye image and right-eye image on the basis of at least one of the brightness of the left-eye image, the brightness of the right-eye image, and the viewing distance, and adjusting depths of the left-eye image and right-eye image according to the moved distance of the pixel;

a liquid crystal panel dividing and displaying the left-eye image and right-eye image with respective adjusted depths thereof, in one of time or space; and Three-Dimensional (3D) special glasses selectively transmitting the left-eye image and right-eye image with respective adjusted depths thereof, wherein the image depth adjustment unit is configured to, when a brightness of a displayed image is constant, increase a pixel movement distance of the image as the viewing distance increases, or when the viewing distance is constant, increase the pixel movement distance of the image as the brightness of the image increases.

6. The image display device according to claim 5, wherein the image depth adjustment unit adjusts the moved distance of the pixel in the left-eye image and right-eye image according to the brightness of the left-eye image and right-eye image, within a maximum depth where accommodation and convergence of the viewer's eyes are matched.

7. The image display device according to claim 5, wherein the image depth adjustment unit adjusts the moved distance of the pixel in the left-eye image and right-eye image according to the viewing distance, within a maximum depth where accommodation and convergence of the viewer's eyes are matched.

8. The image display device according to claim 5, wherein the image depth adjustment unit adjusts the moved distance of the pixel in proportion to the viewing distance and/or the brightness of the left-eye image and right-eye image.

9. The image display device according to claim 5, wherein the distance measurement unit comprises a distance measurement sensor disposed at an external case of the image display device, or comprises a distance measurement sensor disposed at the 3D special glasses.

* * * * *